United States Patent
Black et al.

(10) Patent No.: US 7,386,426 B1
(45) Date of Patent: Jun. 10, 2008

(54) METHOD AND SYSTEM FOR NONLINEAR STATE ESTIMATION

(75) Inventors: Christopher L. Black, Knoxville, TN (US); J. Wesley Hines, Lenoir City, TN (US)

(73) Assignee: Smartsignal Corporation, Lisle, IL (US)

( * ) Notice: Subject to any disclaimer, the term of this patent is extended or adjusted under 35 U.S.C. 154(b) by 0 days.

(21) Appl. No.: 09/561,238

(22) Filed: Apr. 28, 2000

Related U.S. Application Data

(60) Provisional application No. 60/131,898, filed on Apr. 30, 1999.

(51) Int. Cl.
*G06F 17/10* (2006.01)
*G06F 17/18* (2006.01)

(52) U.S. Cl. .............................. 703/2; 702/104; 702/179; 702/181; 702/189; 703/3; 703/4; 703/6

(58) Field of Classification Search .................. 703/2, 703/3, 4, 6; 702/104, 179, 181, 189
See application file for complete search history.

(56) References Cited

U.S. PATENT DOCUMENTS

| | | | |
|---|---|---|---|
| 5,586,066 A * | 12/1996 | White et al. ................ 702/181 |
| 5,680,409 A * | 10/1997 | Qin et al. .................... 714/799 |
| 5,764,509 A * | 6/1998 | Gross et al. ................... 700/29 |
| 5,792,072 A * | 8/1998 | Keefe .......................... 600/559 |
| 5,991,525 A | 11/1999 | Shah et al. ............. 395/500.23 |
| 5,991,735 A | 11/1999 | Gerace ......................... 705/10 |
| 6,100,901 A * | 8/2000 | Mohda et al. ................ 345/440 |

OTHER PUBLICATIONS

Himmelblau et al., "On-Line Sensor Validation of Single Sensors Using Artifical Neural Networks", Proceedings of the American Control Conference, Jun. 1995, pp. 766-770.*
Hines et al., "Plant Wide Sensor Calibration Monitoring", Proceedings of the 1996 IEEE International Symposium on Intelligent Control, Sep. 1996, pp. 378-383.*
Black et al., "Online Implementation of Instrument Surveillance and Calibration Verification Using Autoassociative Neural Networks", Proceedings of Maintenance and Reliability Conference (MACRON 97), May 1997.*
Black et al., "System Modeling and Instrument Calibration Verification with a Nonlinear State Estimation Technique", Proceedings of the Maintenance and Reliability Conference, May 1998.*

(Continued)

*Primary Examiner*—Kamini Shah
*Assistant Examiner*—Herng-der Day
(74) *Attorney, Agent, or Firm*—Fitch, Even, Tabin & Flannery

(57) ABSTRACT

An NSET method and apparatus for modeling and monitoring the status of a system is disclosed. The NSET employs a nonlinear similarity operator in place of linear matrix multiplication, to estimate a set of sensor data based on learned reference data, responsive to receiving a set of actual sensor data. Regularization is used in the generation of the estimate. The estimated data values and the actual sensor data are differenced to produce residuals, which are statistically tested with a SPRT to detect anomalies. Cluster centers may be used to represent learned reference data. The detection of anomalies can be used advantageously for sensor calibration verification.

28 Claims, 12 Drawing Sheets

OTHER PUBLICATIONS

Miron et al., "Fault-Tolerance Improvement for a MSET Model of the Crystal River-3 Feedwater Flow System", 1998 IEEE Nuclear Science Symposium, ovember 1998, pp. 993-994.*

*Understanding Electronic Commerce*, David Kosiur, 1997, Microsoft Press, a Division of Microsoft Corporation.

Abstract of paper entitled "Analytical Enhancements of Automotive Sensory System Reliability", publicly available before Apr. 30, 1998.

* cited by examiner

NSET Test Prediction Error Using RMPE Operator and Varying Minkowski Parameter

Drifted measurement and NSET estimate (Drift commencing at sample 751)

METHOD AND SYSTEM FOR NONLINEAR STATE ESTIMATION

This application claims priority under 35 U.S.C. § 119(e) to provisional application No. 60/131,898, filed Apr. 30, 1999, by Black, et al., which is hereby fully incorporated by reference.

TECHNICAL FIELD OF THE INVENTION

This invention relates generally to methods and systems for process modeling and analysis. More particularly, the present invention relates to an improved nonlinear state estimation technique (NSET) to perform process modeling and analysis of, for example, buyer purchasing characteristics.

BACKGROUND OF THE INVENTION

Systems and methods for process modeling and analysis are well known in the art. For example, artificial neural networks, such as those disclosed in co-pending patent application, entitled "An Improved Method and System For Training An Artificial Neural Network," having a filing date of Mar. 31, 1999, Ser. No. 09/282,392, and assigned to the same assignee as the present patent application, multi-variate state estimation techniques (MSET), as described by Singer, et al., in a paper entitled "Analytical Enhancements of Automotive Century System Reliability," dated June 1994, and multiple regression techniques, all are used for process modeling and analysis in varying applications. Similarly, prior art basic nonlinear state estimation techniques are also known for use in process modeling. Each of these prior art methods, however, suffers from limitations in terms of accuracy and modeling flexibility.

Artificial neural networks, for example, although suitable for modeling certain systems, require extensive training and are time-intensive, which makes them unsuitable for applications in which a system, and corresponding modeling of that system, must be done in near real time. An artificial neural network would thus be unsuitable, for example, to predict behavior in a e-commerce setting where the future behavior of a customer is desired to be known. Applying artificial neural networks to model the behavior of each customer in such an application, in which new information (in the form of additional variables) becomes available as time evolves, is not possible, as means do not exist for rapid adjustment of the model of such a system to predict behavior. The iterative process required to train an artificial neural network is not conducive to modeling rapidly changing systems in which a rapid model adjustment is necessary once one or more new variables has become available.

MSETs and basic NSETs also face limitations in that they rely upon the inversion of data matrices (recognition matrices) that are sometimes singular (in which case inversion is impossible) or near-singular, in which case inversion is possible but end result prediction accuracy is negatively affected. Furthermore, MSETs have poor stability with respect to choice of data included in the prototype matrix, i.e., the inclusion/exclusion of any particular single data point in the prototype matrix can unduly affect prediction results. This is actually a result of co-linearities among the prototypical data points.

Lastly, the distance/similarity function typically chosen for use in MSETs is selected based upon its tendency to produce relatively well-conditioned (when compared to other distance/similarity functions) recognition matrices. Condition is an inverse measure of singularity (i.e., well-conditioned implies non-singular, which is good, while poorly-conditioned implies near-singular, which is bad). Such a distance/similarity function, while generally providing better-conditioned recognition matrices, is not optimal in terms of accuracy and modeling flexibility.

SUMMARY OF THE INVENTION

Therefore, a need exists for a method and system for nonlinear state estimation for process modeling and analysis that can achieve improved matrix conditioning, improved model stability and improved prediction accuracy. Such a method and system would use regularization principles in the inversion of prototype matrices, so as to avoid prior art problems encountered in the inversion of troublesome singular or near-singular prototype matrices.

An ever further need exists for an NSET with improved stability in the selection of datasets included in the prototype matrix, that can reduce or eliminate co-linearities among the prototypical data points.

A still further need exists for an NSET method and system that uses a distance/similarity function optimized to provide greater accuracy and modeling flexibility.

Even further, a need exists for an NSET method and system that can use a broader spectrum of distance functions, thereby allowing for the development of more flexible system models that can be optimized to a particular data set or system to be modeled.

In accordance with the present invention, a method and system for nonlinear state estimation is provided that essentially eliminates or reduces disadvantages and problems associated with previously developed systems and methods for process modeling and analysis, including the problems of non-optimal prototype matrix selection, instabilities with respect to choice of data, and non-optimal distance/similarity functions resulting in reduced accuracy and modeling flexibility.

More specifically, the present invention provides, in one embodiment, an NSET method and system for modeling the behavior of a visitor to an e-commerce location. The method of this embodiment comprises the steps of: obtaining one or more visitor characteristic values; developing a model of the visitor's behavior according to a nonlinear state estimation technique (NSET); and estimating a set of visitor behavior characteristic to model the visitor's behavior using the developed model. The method of this embodiment further comprises the step of predicting the visitor's future behavior at the e-commerce location based on the set of behavior characteristic values and known statistical behavior characteristic values.

The method of this invention can further comprise determining a set of residuals between the set of estimated behavior characteristic values and a set of actual behavior values and statistically monitoring the set of residuals. The NSET's parameters (the choice of similarity/distance function, and the number of prototypical datapoints) can then be adjusted to compensate for the residuals.

The method of this invention can further likewise comprise determining residuals between the estimated current and future behavior characteristic values and a set of desired behavior values. The e-commerce location can then be adjusted to compensate for the residuals. The adjusting of the e-commerce location can comprise adjusting goods, services and/or advertising provided at the e-commerce location.

Developing the model of a visitor's behavior comprises selecting a representative sample data set, based on the visitor characteristic values, from a set of statistical characteristic data within a historical database. The visitor characteristic values can comprise visitor demographic information and visitor purchase habits.

The method of this invention can further comprise measuring a set of actual behavior values for a visitor based on the visitor's actual behavior at an e-commerce location, and comparing the set of estimated behavior characteristic values and the set of actual behavior values with at least one similarity operator. The method of this invention can be implemented as a system of operational instructions that can be stored in a memory and executed by a processing module.

An important technical advantage of the method and system for nonlinear state estimation for process modeling and analysis of this invention is that it can achieve improved matrix conditioning, improved model stability and improved prediction accuracy using principles of regularization in the inversion of prototype matrices.

Another technical advantage of the NSET of this invention is improved stability in the selection of datasets included in the prototype matrix that can reduce or eliminate co-linearities among the prototypical data points.

Still another technical advantage of the NSET method and system of this invention is the use of a distance/similarity function optimized to provide greater accuracy and modeling flexibility.

Yet another technical advantage of the NSET method and system of the present invention is the ability to use a broader spectrum of distance functions that allow for the development of more flexible system models that can be optimized to a particular data set or system to be modeled.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Figure 1:
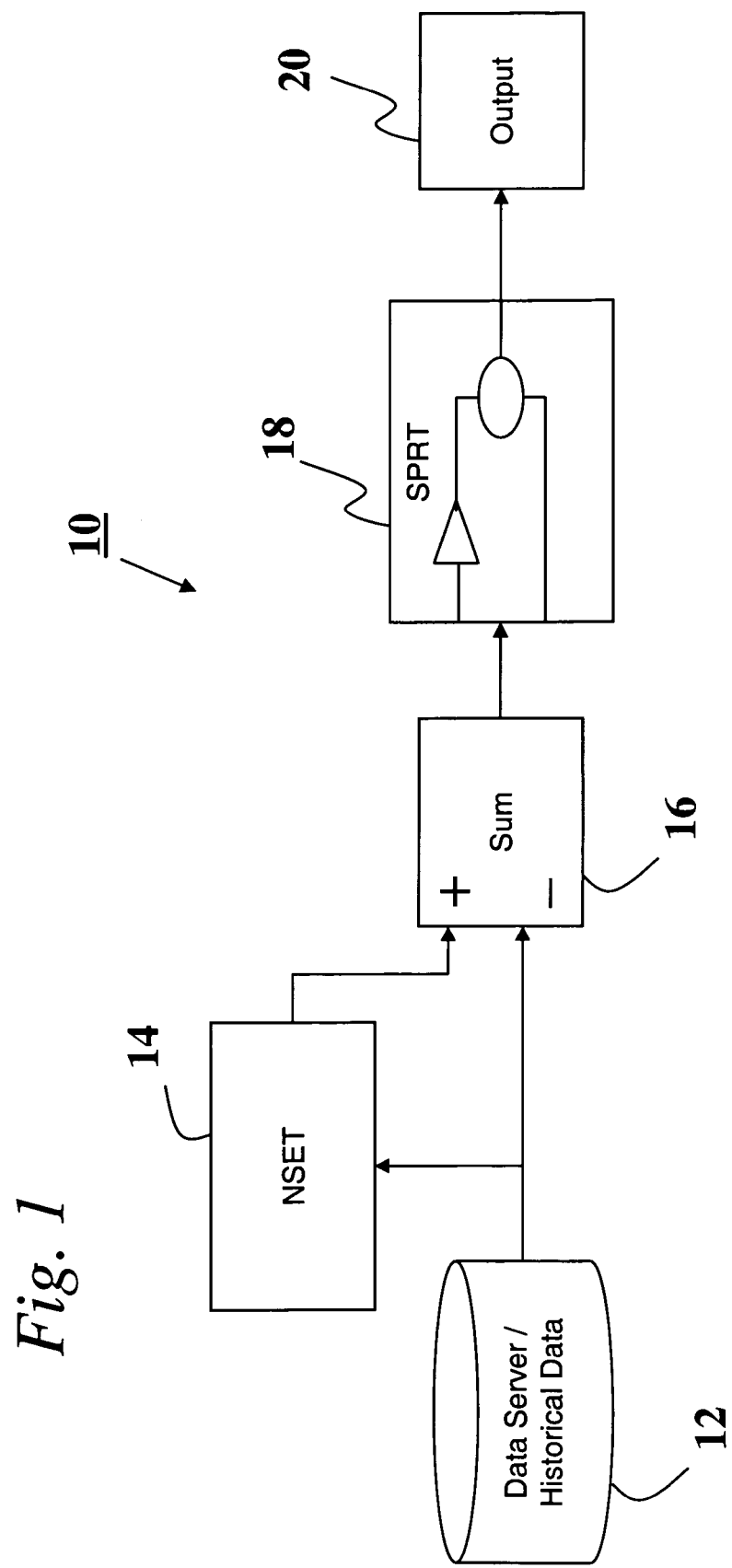
FIG. 1 illustrates an embodiment of the NSET method and system of this invention to perform process modeling and monitoring.

Preferred embodiments of the present invention are illustrated in the FIGURES, like numerals being used to refer to like and corresponding parts of various drawings.

A nonlinear state estimation technique (NSET) has been developed to perform process modeling and analysis. One embodiment of the NSET of this invention can be used to model a sensor and associated instrument channel calibration verification system. The model estimates the true process values, as functional sensors would provide them. The residuals between these estimates and the actual measurements (from sensors of unknown condition) can then be monitored using the sequential probability ratio test, a statistical decision method.

Still another embodiment of the NSET of this invention can be used in an electronic commerce (e-commerce) setting to model the behavior of human visitors to a web-site. For example, based on a visitor's demographic information or prior purchase history, future purchase activity by the customer can be predicted. The NSET of this invention can very rapidly adjust prediction models to account for any new piece of information relating to a visitor since that visitor's last visit to the e-commerce site.

The NSET method and system of this invention can be used to model many other systems than the illustrative embodiments discussed above. In particular, the NSET of this invention can be used in the various applications discussed in copending patent application, entitled "An Improved Method and System For Training An Artificial Neural Network," having a filing date of Mar. 31, 1999, Ser. No. 09/282,392, and assigned to the same assignee as the present patent application, hereby incorporated by reference in its entirety. The NSET of this invention can thus serve as a general technique for predictive and estimative modeling applicable to a variety of systems and applications.

The NSET of this invention is a generalization of the multivariate state estimation technique (MSET) described by Singer, et al. The MSET itself is an extension of the least-squares minimization of the multiple regression equation, incorporating proprietary comparison operators. The theoretical introduction to these estimation techniques is provided, and the NSET is demonstrated with several different comparison (either similarity or distance) operators, below. The estimation performance of the NSET for each of these operators is also evaluated below, resulting in a recommended operator for general process modeling purposes. The NSET is demonstrated, in one embodiment, as the modeling engine for a calibration verification system.

The NSET, MSET, and the multiple regression solution all utilize similarity operators to compare new measurements to a set of prototypical measurements or states. This comparison process generates a weight vector that is used to calculate a weighted sum of the prototype vectors. The sum is weighted to provide an estimate of the true process values.

For the similarity function, multiple regression utilizes the dot product, the MSET uses one proprietary similarity/distance operators, and the NSET of this invention can incorporate one of several possible operators, many of which are presented, demonstrated and evaluated below.

The NSET of this invention functions as an regressive model, reproducing an estimate of as set of variables based upon the set of measured signals that are provided as inputs to the model. The training is single-pass (i.e., is not an iterative process), and consists of little more than the operations involved in a single matrix multiplication and an inversion or decomposition. Data selection plays an important role, as the number of operations (and processor time) required per recall is proportional to the product of the number of prototype measurements and the dimensionality of the measurements. Therefore, as a function of the number of signals to be monitored, and the data availability rate, there is an upper limit upon the number of patterns that may be included in the prototype measurement matrix. As the purpose of the prototype matrix is to compactly represent the entire dynamic range of previously observed system states, the patterns that are included should be carefully chosen.

As an example of the multiple regression technique improved upon by the NSET of this invention, let A, referred to as the prototype matrix, represent a matrix assembled from selected column-wise measurement vectors, and let w, represent a vector of weights for averaging $\underline{A}$ to provide the estimated state $\underline{y}'$ as follows:

$$\underline{y}' = \underline{\underline{A}} \cdot \underline{w} \tag{Eqn. 1}$$

Alternatively, variables other than those making up the 'state vector' may be predicted/estimated by augmenting or replacing the prototype matrix included in equation 1, such that it now contains additional variables. I.e., the weight vector is determined via the state vectors in the prototype matrix and their comparison to the new state vector, but is used to multiply other variables besides the ones included in the state vector.

The column-wise measurement vectors which make up the prototype matrix $\underline{\underline{A}}$ are usually selected by a clustering data analysis technique. This selection is carefully performed to provide a compact, yet representative, subset of a large database of measurements spanning the full dynamic range of the system of interest. For example, in an e-commerce setting, the measurement vectors might be specific attributes from a historical database of visitor attributes that are shared by a current visitor.

An example of a prototype matrix, constructed from the vertices of a unit cube is given:

$$\underline{\underline{A}} = [\underline{x}(1)\underline{x}(2) \cdots \underline{x}(n)] = E.g., \begin{bmatrix} 0 & 0 & 0 & 0 & 1 & 1 & 1 & 1 \\ 0 & 0 & 1 & 1 & 0 & 0 & 1 & 1 \\ 0 & 1 & 0 & 1 & 0 & 1 & 0 & 1 \end{bmatrix} \tag{Eqn. 2}$$

If $\epsilon$ represents the difference between an observed state $\underline{y}$ and the estimated state $\underline{y}'$, then the following relations may be constructed:

$$\underline{\epsilon} = \underline{y} - \underline{y}' = \underline{y} - \underline{\underline{A}} \cdot \underline{w} \tag{Eqn. 3}$$

The least squares solution to the minimization of $\epsilon$ yields the following expression for $\underline{w}$, (where the left hand factor of the matrix product is known as the recognition matrix):

$$\underline{w} = (\underline{\underline{A}}^T \cdot \underline{\underline{A}})^{-1} \cdot (\underline{\underline{A}}^T \underline{y}) \tag{Eqn. 4}$$

A chief liability of this method is that linear interrelationships between state vectors in $\underline{\underline{A}}$ result in conditioning difficulties associated with the inversion of the recognition matrix. This shortcoming is avoided by the NSET of this invention by applying nonlinear operators, as shown later, in lieu of the matrix multiplication. These operators generally result in better conditioned recognition matrices and more meaningful inverses of the recognition matrices.

The conditioning difficulty may also be ameliorated by solving the normal equations for the weight vector, as shown in Equation 5 below. Solving the normal equations involves a decomposition of the recognition matrix and then elimination or back-substitution.

$$(\underline{\underline{A}}^T \cdot \underline{\underline{A}}) \cdot \underline{w} = \underline{\underline{A}}^T \cdot \underline{y} \tag{Eqn. 5}$$

Although the decomposition of the recognition matrix must only be performed once, up-front in a learning phase, the solution of the normal equations requires more operations per vector (than when simply using the matrix inverse) in the deployment or recall phase.

Unfortunately, the normal equations are not themselves immune to numerical instabilities. This is because zero or near zero pivot elements, due to correlation among prototype measurements, may be encountered during solution (elimination) of the normal equations. Zero and near-zero pivot elements result in, respectively, no solution, or a solution in which some of the fitted parameters (weights) have large magnitudes that delicately cancel one another out. Singular value decomposition (SVD) is a particularly stable (with regard to rank deficiencies) method of matrix decomposition for finding the pseudoinverse of a matrix. The SVD algorithm assigns small magnitude weights to prototype vectors whose combinations are irrelevant to the fit. This results in a fit that handles both overdetermined-ness (minimizes squared error) and underdetermined-ness (minimizes effect of correlation among prototypes), and as a result is numerically very dependable.

The NSET of this invention can use, as shown below, the SVD algorithm to provide a pseudo-inverse of the recognition matrix, which is then employed in the manner of the true inverse of equation 4. This pseudo-inversion is performed in a training phase prior to deployment of the model, and is considered analogous to the up-front training of an artificial neural network (ANN) model.

Another drawback (also necessitating the use of different similarity operators) to the least squares solution of the multiple regression equation is that perturbations outside the range observed in the prototype matrix in a single element of the observation vector result in large estimation errors. Whether or not this quality is truly a disadvantage is not clear, as a conservative model might be expected to fail dramatically, as opposed to giving reasonable looking, but inaccurate, results. In other words, it is questionable whether any propensity to always supply a reasonable appearing, though possibly incorrect result should be considered a positive trait. This is an issue implicit in any empirically derived modeling application in which the general form of the relationship is not known or presumed. Extrapolation features of the NSET (or of data-derived models in general) are outside the scope of this invention.

The NSET of this invention extends the multiple regression equations. This NSET of this invention (as does MSET) springs forth from the multiple regression result as follows:

$$\underline{w} = (\underline{\underline{A}}^T \oplus \underline{\underline{A}})^{-1} (\underline{\underline{A}}^T \oplus \underline{y}) \tag{Eqn. 6}$$

or in normal equation form, $$(\underline{\underline{A}}^T \oplus \underline{\underline{A}}) \underline{w} = \underline{\underline{A}}^T \oplus \underline{y}. \tag{Eqn. 7}$$

The $\oplus$ symbol above represents any appropriate similarity or difference operator applied upon matrices. The definitions of a few of the many possible candidate operators that can be used with the NSET of this invention and provided below are all scalar-valued functions on vectors. The vector functions are easily extended to the required matrix functions by selecting vectors from the two input matrices and positions in the output matrix in exactly the familiar row and column manner used in performing individual vector dot products in matrix multiplication. Some of the possible candidates for distance/similarity operators include:

1. Bernoulli difference (BDIF) {requires y∈(0,1)}:

$$f(\underline{x}, \underline{y}) = -\frac{1}{M\log(2)}\sum_{m=1}^{M}[x_m\log(y_m) + (1-x_m)\log(1-y_m)] \quad \text{(Eqn. 8)}$$

2. Relative entropy (RENT) {requires y>0}:

$$f(\underline{x}, \underline{y}) = -\frac{1}{M\log(2)}\sum_{m=1}^{M} x_m\log(y_m) \quad \text{(Eqn. 9)}$$

3. Euclidean norm (DIST):

$$f(\underline{x}, \underline{y}) = \sqrt{\sum_{m=1}^{M}(x_m - y_m)^2} \quad \text{(Eqn. 10)}$$

4. City block distance (CITY):

$$f(\underline{x}, \underline{y}) = \sum_{m=1}^{M}|x_m - y_m| \quad \text{(Eqn 11)}$$

5. Linear correlation coefficient (LCC):

$$f(\underline{x}, \underline{y}) = \frac{\sum_{m=1}^{M}(x_m - \bar{x})(y_m - \bar{y})}{\sqrt{\sum_{m=1}^{M}(x_m - \bar{x})^2 \sum_{m=1}^{M}(y_m - \bar{y})^2}} \quad \text{(Eqn. 12)}$$

6. Common mean linear correlation coefficient (CMLCC):

$$f(\underline{x}, \underline{y}) = \frac{\sum_{m=1}^{M}(x_m - \bar{x})(y_m - \bar{x})}{\sqrt{\sum_{m=1}^{M}(x_m - \bar{x})^2 \sum_{m=1}^{M}(y_m - \bar{x})^2}} \quad \text{(Eqn. 13)}$$

7. Root mean power error (RMPE):

$$f(\underline{x}, \underline{y}, \mu) = \mu\sqrt{\frac{1}{M}\sum_{m=1}^{M}(x_m - y_m)^\mu} \quad \text{(Eqn. 14)}$$

8. Scaled mean power error (SMPE):

$$f(\underline{x}, \underline{y}, \mu) = \frac{1}{\mu M}\sum_{m=1}^{M}(x_m - y_m)^\mu \quad \text{(Eqn. 15)}$$

9. Matrix multiplication (MMLT):

$$f(\underline{x}, \underline{y}) = \sum_{m=1}^{M} x_m \cdot y_m \quad \text{(Eqn. 16)}$$

10-18. Versions of candidate operators 1-9, 'inverted' so that large similarities correspond to small distances and small similarities correspond to large distances, as concisely follows:

$$f(\underline{x}, \underline{y}) = \frac{1}{1 + f'(\underline{x}, \underline{y})} \quad \text{(Eqn. 17)}$$

One embodiment of the NSET method and system of this invention can be used to perform process modeling of an instrument calibration verification system as shown in FIG. 1. The instrument calibration verification system (ICVS) 10 includes Data Server 12, denoted "Data Server or Historical Data," in FIG. 1, which is used to either obtain real-time samples of the measurements provided by a server program on a plant computer, or to provide previously acquired and stored samples. These measurements are provided to the NSET model 14, which produces the prediction (estimate) of the true process value. Summing module 16 determines the difference (residual) between measurement and model prediction and forwards this result to the sequential probability ration test (SPRT) module 18. SPRT is a statistical decision technique that evaluates the difference, or residual, obtained between measurement and model prediction, and determines when drift or failure has occurred. The SPRT has previously been applied to detection in neural network model based ICVSs and in signal monitoring applications incorporating other model techniques. A full description of its role in the ICVS is not provided here, but it is known to those familiar with the art. Lastly, output module 20 provides the results of the comparison between measured values and model prediction.

An embodiment of the NSET of this invention applied to an e-commerce setting, and analogous to the ICVS embodiment discussed above, is now described. This illustrates an application of the NSET of this invention in an e-commerce setting to predict the behavior of a visitor to an e-commerce site. The database comprises data points representative of variables such as gender, socio-economic level, geographic location, past purchases, etc. over a large population. These data points can span the range of variables they represent. The variables tracked and stored within the database can be arbitrarily selected to match the needs of the e-commerce site implementing this invention.

When a visitor arrives at an e-commerce site implementing this invention, some information is known about him or her. For example, the visitor's IP address can be identified as belonging to a certain geographic region. Further information can also be known about the visitor from, for example, a sign-in sheet at the e-commerce website that requests demographic information from a customer. Other methods of obtaining information can also be used, such as placing cookies on a visitor's computer or tracking the web page from which a visitor arrived and the path traversed through the e-commerce website. The visitor information that is known can then be compared by the NSET of this invention to statistical historical data contained in the database.

The database can be comprised of historical information of various parameters as discussed above, and cover a large population base. The database can be initially populated with statistical information that is likely to be relevant, and can then be continuously updated based on new information on visitors to the e-commerce or other relevant information. The database can also be updated with statistical information from other contexts other than e-commerce.

The NSET of this invention will compare a visitor's characteristic values (in the form of data vectors) to the historical data in the database to predict or diagnose the visitor's behavior (predict how he or she will behave on the web site) by pulling data points from similar value patterns as the visitor from the database. This data selection is done using a clustering technique, as discussed herein.

For example, a visitor's data vector or vectors can be compared to the vectors in a prototype matrix, where the vectors in the prototype matrix comprise statistical characteristic values on height, weight zip code, gender, socio-economic status, etc. All of these pieces of information could be contained in the historical database, comprising statistical characteristic values obtained over a large population.

When a visitor with known behavior characteristic values (vectors) visits an e-commerce site, the NSET of this invention can, based on those known vectors, pull from the database data for similar patterns as those of the visitor. For example, if a visitor is known to be a Latin-American female, middle-class, that lives in East Austin, the NSET of this invention can pull from the historical database a preset number of patterns that match the visitor's patterns and populate a prototype matrix. The prototype matrix can then be inverted as per the teachings of this invention, and a prediction made for the visitor's behavior based on the statistical data and the correlating statistical behavior for that data obtained from the database. The likely behavior of this visitor can then be predicted as per the teachings of this invention.

The NSET of this invention can adjust its predictions based on new information. For example, if the same visitor as discussed above revisits the same e-commerce location at some future time and divulges, either through direct entry or through some statistical extrapolation (for example the visitor could enter a zip code which the e-commerce site, implementing the NSET of this invention, could recognize as a geographic area with a large concentration of politicians or a large concentration of wealthy persons, etc.), a new characteristic data value, the NSET can populate a prototype matrix with appropriate data sets more closely matching the user's profile. On this subsequent visit, the NSET of this invention can pull from the historical database, which can be a preorganized and indexed database allowing for quick extraction of data, a new set of patterns with which to populate the prototype matrix that incorporates statistical information for wealthy individuals or politicians. Prediction for the behavior of this visitor can then be more accurately obtained. This model fine-tuning can take place several times during the same customer visit, as new information is added to the profile.

The NSET of this invention makes its predictions of the behavior of a visitor (or other measured value) by obtaining a weighted average of the outputs associated with the historical data obtained from the database. This weighted average is determined based on how close a new data vector is to each of the historical vectors pulled from the database. If the new vector is identical to an old vector, the weighted average might be weighted to infinity for that vector, while all other historical vectors obtained from the database are weighted relatively close to zero.

However, if the new vector for a visitor is situated between two historical vectors, then those two vectors might be weighted equally, and so on.

The NSET of this invention seeks to avoid inverting a large prototype matrix by using clustering techniques to pull only highly relevant data clusters (data points) from the historical database to populate the prototype matrix. In this way, whenever a comparison is made between historical data in the database and an actual visitor's data vectors, a highly relevant prototype matrix is generated to compare against the visitor. This highly relevant data set is designed to result in a minimum number of data points (the smallest number of data points that will likely yield an accurate prediction) to be inverted in the prototype matrix.

The database provides the historical statistical data points pulled for a comparison to an actual visitor and provides them to NSET 14. NSET model 14 produces the prediction (estimate) of the behavior of that visitor as discussed previously. Output module 20 then supplies the generated prediction to the e-commerce site implementing this invention. The method of this invention can be implemented as operation instructions executed by processing module, and stored within memory.

Another embodiment of the NSET of this invention can be used to compare the accuracy of the predictions of NSET module 14 against the actual behavior of a visitor to an e-commerce site according to the teachings of this invention. The historical database can be updated throughout and following a visit and action by a visitor, and prediction of that visitor's behavior. The method and system of this invention can track the visitor's actual behavior following the prediction and subsequently modify the system (similarity function and prototype vectors) to improve the future prediction.

The embodiment of this invention described above can be used to compare the actual behavior of a visitor to the predicted behavior as generated by NSET module 14. In a manner similar to that discussed above with respect to FIG. 1, the actual behavior of the visitor is compared to the visitor's predicted behavior by SPRT module 18, which evaluates the difference (residual) obtained between actual measurement and model prediction.

Using this embodiment, the system and method of this invention can be used to verify the accuracy of the predictions made by the NSET of this invention and to adjust the NSET to increase prediction accuracy. Furthermore, the e-commerce location implementing the method and system of this invention can likewise be adjusted to compensate for the differences between actual or predicted and desired visitor behavior. For example, the goods, services and/or advertising provided by the e-commerce location can be adjusted to generate more purchases from visitors. Targeted advertising can also be implemented based on the accuracy of the NSET's predictions.

For the purposes of demonstrating system modeling by the NSET of this invention (as well as characterizing the relative performance of the candidate operators relative to one another for this demonstration application), a sample datafile was created containing process measurements from the Oak Ridge National Laboratory's (ORNL's) High Flux Isotope Reactor (HFIR). This datafile spans the research reactor's entire fuel cycle, and contains 1636 time-measurements. Each time-measurement contains 34 of the 56 analog signals provided (every 2 seconds) by the data server on the HFIR's plant computer. The 22 discarded analog signals include a few process variables that never demonstrate any variation from a constant measurement value. Other variables, also discarded, possessed sufficient physical redundancy such that inclusion might serve to weaken a demonstration of the modeling of an analytically redundant modeling system. Some variables represented only simple sums or averages of other measured analog quantities, and were not included.

The constructed datafile contained 1636 data vectors representing a stratified sample (every nth sample) of an entire fuel cycle (startup transient, full power operation, and shutdown transient). This data was clustered using a hyperbox clustering technique, so that a pre-specified number (100 in this example) of data clusters were created. The datapoint closest to the center of each cluster centroid was included in the prototype matrix.

For the prototype matrix created, the 18 candidate operators were each explored by computing the sum-squared error (SSE) between NSET model estimation and measurement of the original datafile. As previously mentioned (specifically, in equations 8 and 9), some of the operators require a particular domain. In addition, demonstration of the effect of scaling upon estimation was desired. To these ends, each operator was first used and evaluated with raw (non-scaled) data. Linear scaling of the data to [0.1, 0.9] was then performed. The range (the central region of the sigmoid function) of the linearly scaled data was arbitrarily chosen, as previously existing routines for artificial neural network input/output scaling were conveniently available. The estimation was repeated for each operator, and the estimates were 'de-scaled' for evaluation. Finally, this estimation was performed similarly as before with the linear scaling case, but with mean-centered unit-variance (MCUV) scaling and de-scaling. MCUV scaling results in each individual scaled time-series possessing a mean of zero and variance of one. The results of this demonstration are given below in Table 1. The columns and rows of Table 1 respectively correspond to the scaling method and the similarity/distance operator utilized.

TABLE 1

Test Prediction Error Results for forward and Inverse Distance/Similarity Operators

| | Forward Test SSE | | | Inverse Test SSE | | |
|---|---|---|---|---|---|---|
| | None | Linear | MCUV | None | Linear | MCUV |
| BERR | | 2.52E+06 | | | 7.43E+03 | |
| RENT | | 1.10E+07 | | | 6.93E+04 | |
| DIST | 6.68E+03 | 1.25E+04 | 1.45E+04 | 1.29E+07 | 4.83E+04 | 2.60E+05 |
| CITY | 4.85E+03 | 1.53E+04 | 1.51E+04 | 4.22E+07 | 1.54E+05 | 7.86E+05 |
| LCC | 1.27E+06 | 4.02E+06 | 6.16E+05 | 6.99E+04 | 3.02E+07 | 7.97E+07 |
| CMLCC | 3.09E+03 | 5.12E+05 | 1.54E+05 | 2.64E+03 | 1.10E+08 | 3.42E+08 |
| RMPE | 6.68E+03 | 1.25E+04 | 1.45E+04 | 7.61E+05 | 1.63E+04 | 4.17E+04 |
| SMPE | 3.58E−12 | 1.42E−13 | 1.72E−15 | 2.65E+06 | 3.27E+02 | 6.48E+03 |
| MMLT | 9.38E−10 | 5.84E−13 | 2.33E−16 | 6.33E+04 | 3.95E+06 | 2.94E+09 |

Table 2, following, provides the recall estimation rate on a 200 MHz Pentium PC for only the 'forward' version of each operator, as the inverse versions were found to differ by less than 1%. The operators were initially formulated such that all arithmetic was performed as a series of scalar operations upon the elements of two vectors. The 'vectorized' versions are enhanced such that the operators involve a series of vector operations upon matrices, and are thereby significantly improved in MATLAB, the interpreted mathematical programming environment used for NSET development. Future recoding in C++ is expected to bring about further and more significant recall estimation rate improvements.

TABLE 2

Recall Estimation Rate For Various Distance/Similarity Operators

| | Estimations/Second | |
|---|---|---|
| | Original | Vectorized |
| BERR | 16.73 | 45.70 |
| RENT | 51.79 | 87.67 |
| DIST | 39.77 | 142.19 |
| CITY | 49.31 | 123.56 |
| LCC | 16.56 | 55.22 |
| CMLCC | 15.21 | 41.74 |
| RMPE | 43.50 | 90.16 |
| SMPE | 46.32 | 95.29 |
| MMLT | | 551.61 |

Illustration of inversion difficulties is provided below in Table 3. The last three columns consist of a reciprocal condition number associated with the recognition matrix for each combination of operator and scaling combination. A value near one is associated with an easily invertible matrix, while values approaching zero are associated with near singular matrices. The first three columns of Table 3 correspond to an index created to describe the quality of the pseudo-inverse obtained from the recognition matrix. The index is obtained by pre-multiplying the recognition matrix by its pseudo-inverse. The sum square difference is then computed between the result and the same size identity matrix. Of particular Interest is the fact that the result obtained, in all cases, closely approaches an integer. Recognition matrices that possess a reciprocal condition number very close to zero ($<10^{-10}$) result in positive integer values (within several decimal places), while greater condition numbers foretell indices near zero. This is consistent with the SVD's method of disregarding more singular values when presented more poorly conditioned matrices.

TABLE 3

Recognition Matrix Inversion and Invertability Indicators

| | Pseudo-inverse Error Index | | | Reciprocal Condition Number | | |
|---|---|---|---|---|---|---|
| | None | Linear | MCUV | None | Linear | MCUV |
| BERR | | 65 | | | 3.18E−19 | |
| RENT | | 66 | | | 6.94E−20 | |

TABLE 3-continued

Recognition Matrix Inversion and Invertability Indicators

| | Pseudo-inverse Error Index | | | Reciprocal Condition Number | | |
|---|---|---|---|---|---|---|
| | None | Linear | MCUV | None | Linear | MCUV |
| DIST | 0 | 0 | 0 | 1.60E-04 | 4.99E-04 | 4.09E-04 |
| CITY | 0 | 0 | 0 | 6.08E-05 | 1.70E-04 | 1.79E-04 |
| LCC | 67 | 67 | 67 | 9.25E-20 | 2.59E-19 | 6.48E-19 |
| CMLCC | 5 | 0 | 0 | 2.36E-15 | 7.48E-10 | 2.44E-08 |
| RMPE | 0 | 0 | 0 | 1.60E-04 | 4.99E-04 | 4.09E-04 |
| SMPE | 64 | 64 | 64 | 3.71E-21 | 5.37E-20 | 3.05E-21 |
| MMLT | 66 | 66 | 66 | 1.81E-20 | 1.29E-19 | 1.15E-20 |

Figure 2:
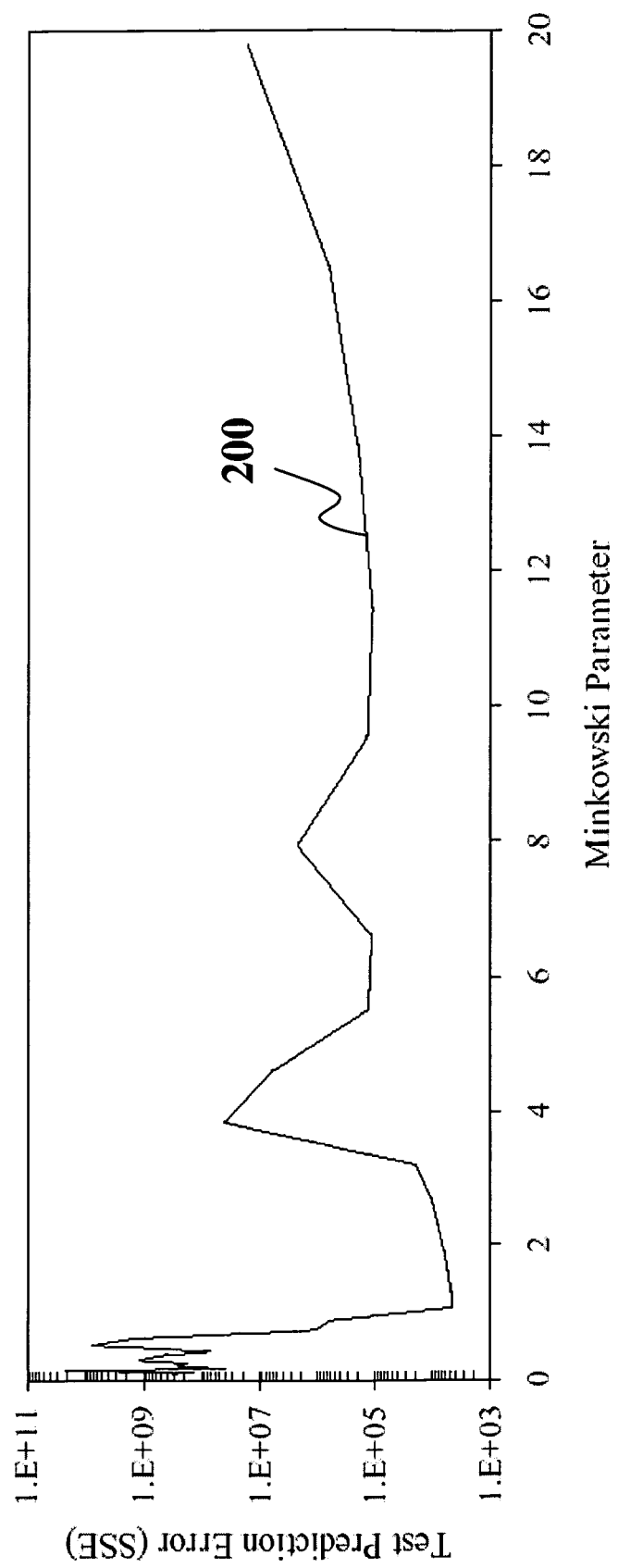
FIG. 2 illustrates the NSET Test Prediction Error using RMPE Operator and Varying Minkowski Parameter.

The root mean power error (RMPE) and scaled mean power error (SMPE) operators contain a variable parameter known as the Minkowski parameter. This parameter influences the proportional effect of each component's difference upon the entire vector distance. At low parameter values, all of the component errors affect the distance. As the Minkowsky parameter is allowed to increase, the distance decreases asymptotically towards the largest component error. As displayed in FIG. 2, this parameter was varied to observe the effect upon test prediction error and yielded curve 200.

Figure 3:
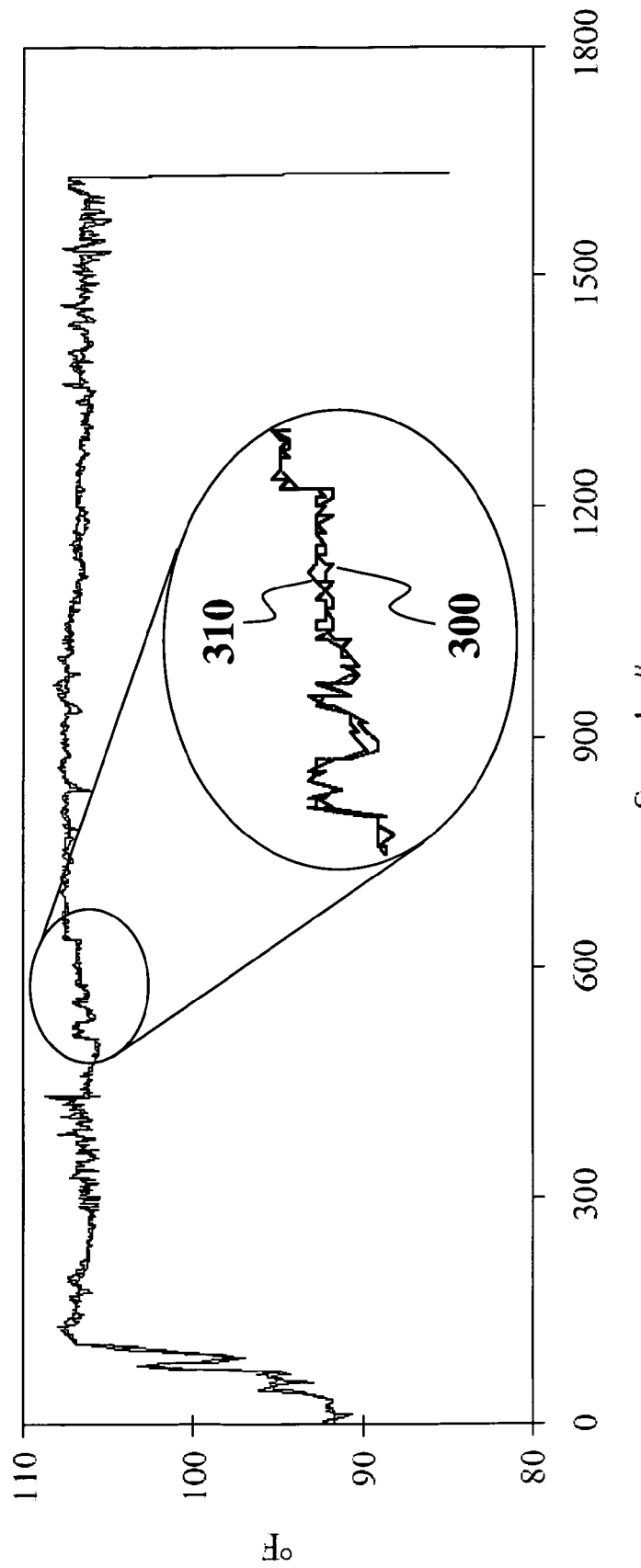
FIG. 3 illustrates Estimated and Measured Cooling Tower Inlet Temperature (DIST—no scaling)

A sum-squared error is a useful comparison metric between prediction methods, but not a very informative standalone statistic, FIGS. 3-12 display measured and predicted individual signals over the entire test set—first with no measurement error, then with measurement error, and finally, with the diagnosis of the calibration verification system. FIG. 3 displays both the measured cooling tower inlet temperature 300 and the estimated cooling tower inlet temperature 310, which overlap significantly as shown. The NSET estimate is obtained using candidate operator #3, the Euclidean distance operator. This operator was found to provide the best combination of estimation accuracy and insensitivity to measurement error for this example.

Figure 4:
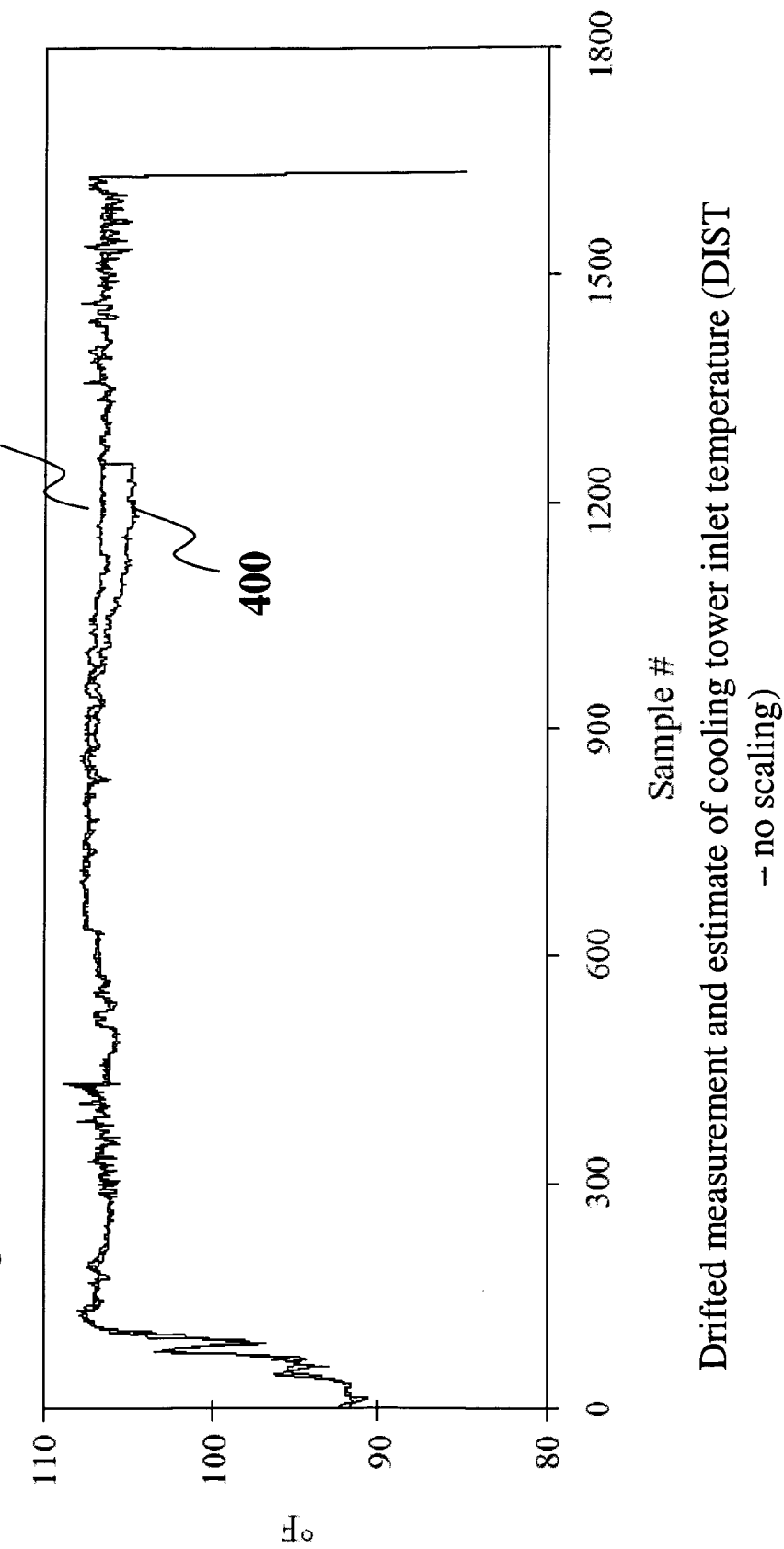
FIG. 4 illustrates the Drifted Measurement and Estimate of Cooling Tower Inlet Temperature (DIST—no scaling)

FIG. 4 contains the measured cooling tower inlet temperature 400, this time incorporating a synthetic linear drift of 0.002% full-scale (% FS) per sample, as well as the 'DIST operator and no scaling version of the NSET estimate 420. Note that the synthetic measurement drift present from sample 751 to sample 1250 is only negligibly present in the NSET estimate 420. This immunity to measurement error makes the NSET an appropriate modeling engine in a calibration monitoring system.

Figure 5:
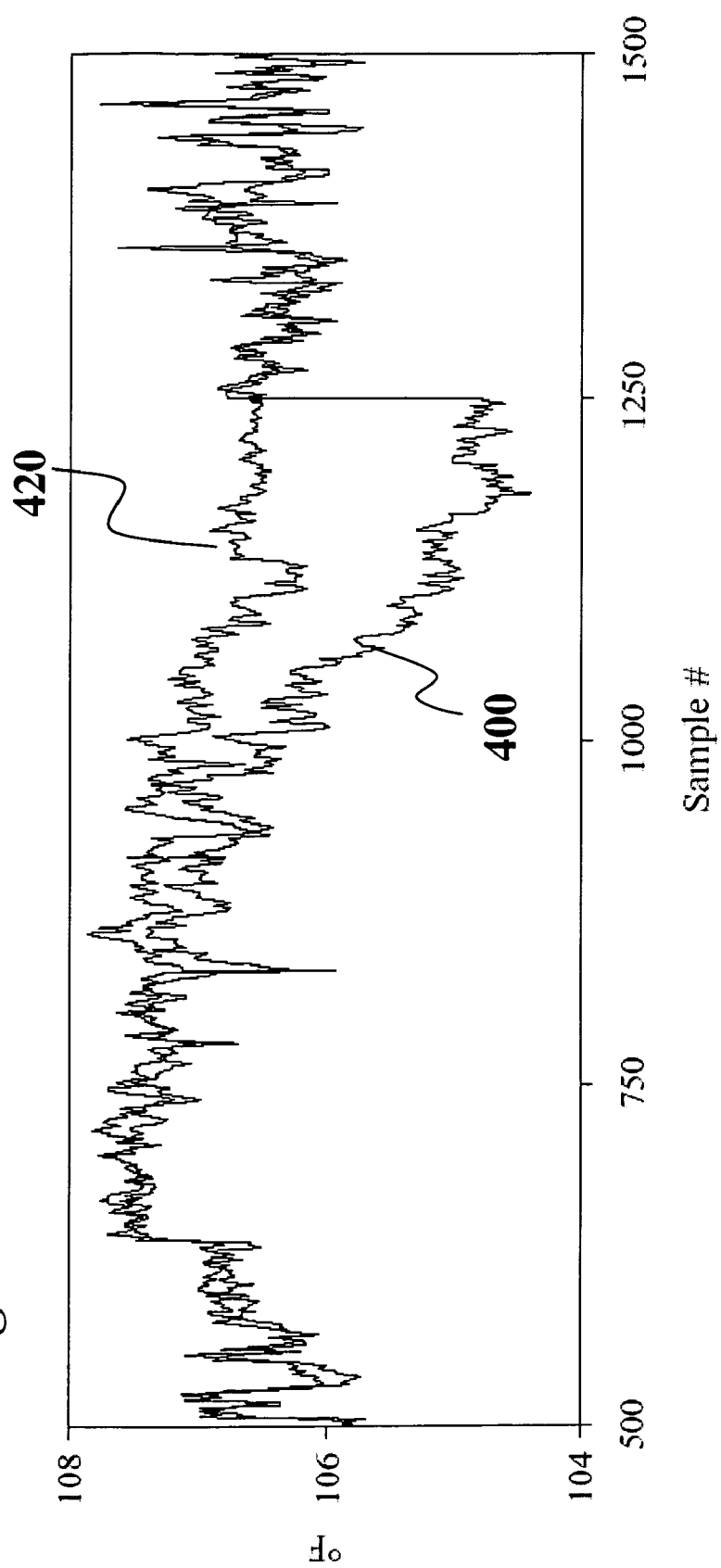
FIG. 5 illustrates the Drifted Measurement and NSET Estimate.
Figure 6:
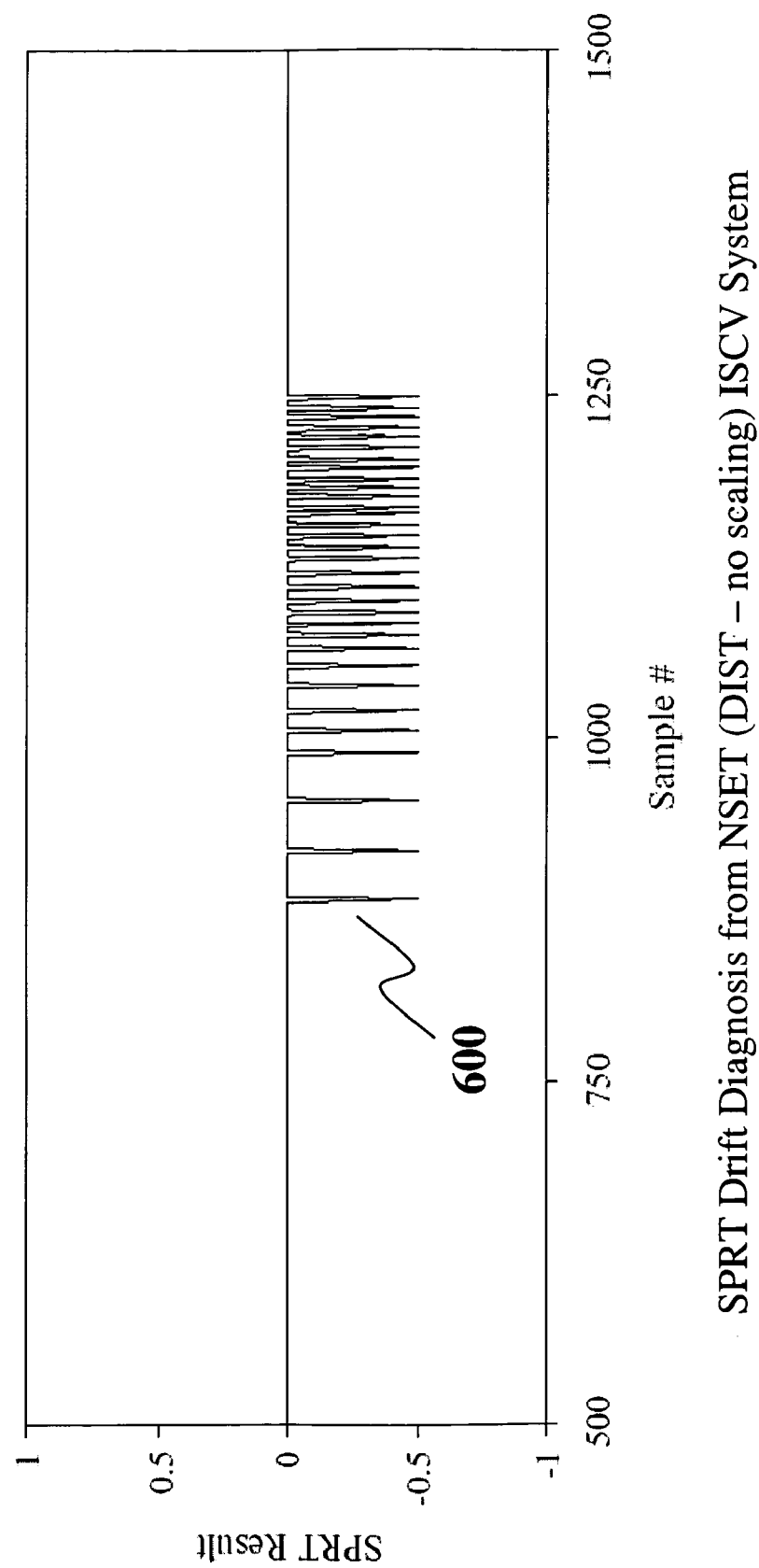
FIG. 6 illustrates the SPRT Drift Diagnosis from NSET (DIST—no scaling) ISCV System.

FIG. 5 redisplays the measurement and estimate in increased detail. FIG. 6 displays the diagnosis of an NSET-based ICVS system on the same scale. The output of the SPRT module, contained in curve 600 of FIG. 6, corresponds to the drift diagnosis. The diagnosis assumes 5 discrete values that correspond to different states of measurement error. Gross drift, indicated by +/−1.0, has been arbitrarily defined as 30% FS. Fine drift, indicated by +/0.5, has arbitrarily been set to be 0.5% FS. No drift is indicated by an SPRT output of 0.0. These values can be set differently as desired.

These sensitivity settings generally result in an appropriate alarm when the measurement has drifted halfway to one of the setpoints. An alarm at this halfway point denotes that the SPRT has decided that it is more likely than not that the system has drifted. As illustrated in FIG. 6, the SPRT catches the drift after 132 samples, corresponding to a drift of 0.26% FS.

One behavior of the SPRT detection system should be noted: after the initial detection, the SPRT redetects the drift with a diminishingly smaller required number of samples. For example, the second detection only takes another 28 samples. Eventually, as the drift approaches 1.0% FS, it is redetected on every other sample. Fewer and fewer samples are required as the drift magnitude gets larger with respect to the nominal variance or random error associated with the residual between the measurement and the NSET estimate.

FIGS. 7-10 display the modeling performance of the NSET using the Euclidean distance operator for the outlet temperature 1 (servo) signal. These FIGUREs profile the performance with another typical signal of the same NSET as before, using the same 100 measurement vector prototype matrix, scaling (none), SPRT sensitivities, and the preferred comparison operator.

Figure 7:
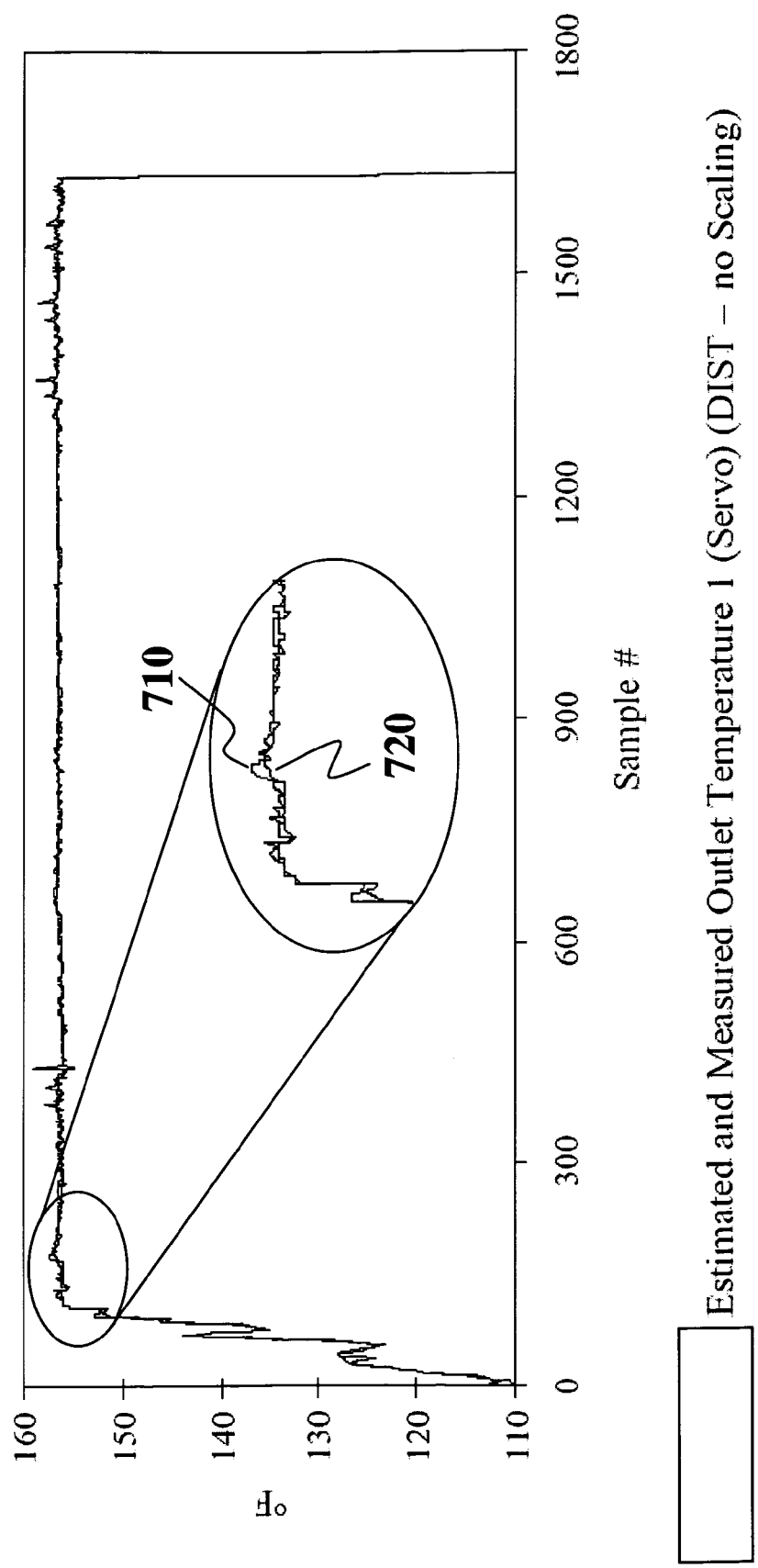
FIG. 7 illustrates the Estimated and Measured Outlet Temperature 1 (SERVO) (DIST—no scaling)
Figure 8:
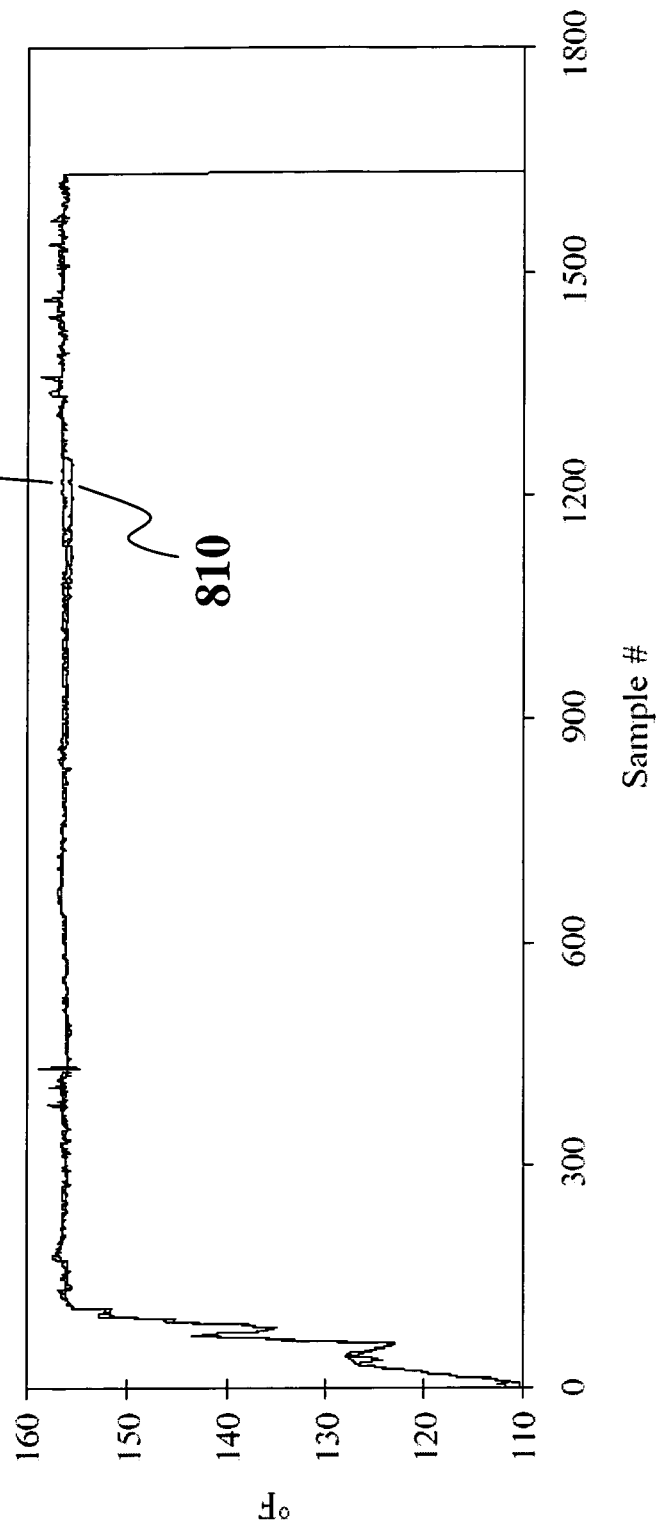
FIG. 8 illustrates the Drifted Measurement and Estimate of Outlet Temperature 1 (SERVO) (DIST—no scaling)
Figure 9:
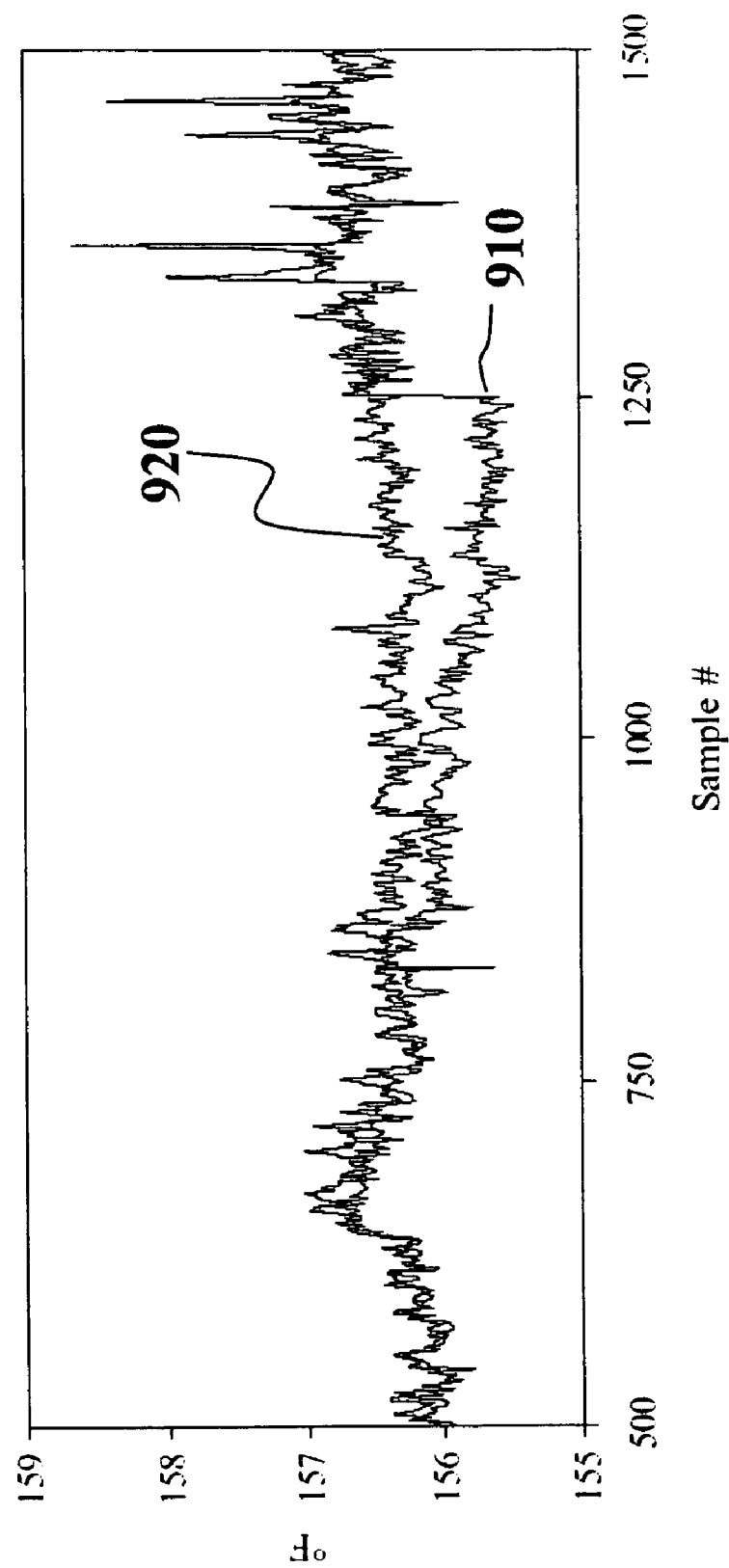
FIG. 9 illustrates the Drifted Measurement and NSET Estimate (Drift Commencing at Sample 751)

In FIG. 7, the measurement and NSET estimate are displayed with no measurement error as curves 710 and 720. FIGS. 8 and 9 demonstrate the behavior of the estimate in the presence of measurement error. A linear drift of 0.002% FS begins at sample 751 and continues until measurement bias of 1% FS has been reached at sample 1250. Measured value curves 810 (FIG. 8) and 910 (FIG. 9) and NSET estimate curves 820 (FIG. 8) and 920 (FIG. 9) illustrate these findings.

Figure 10:
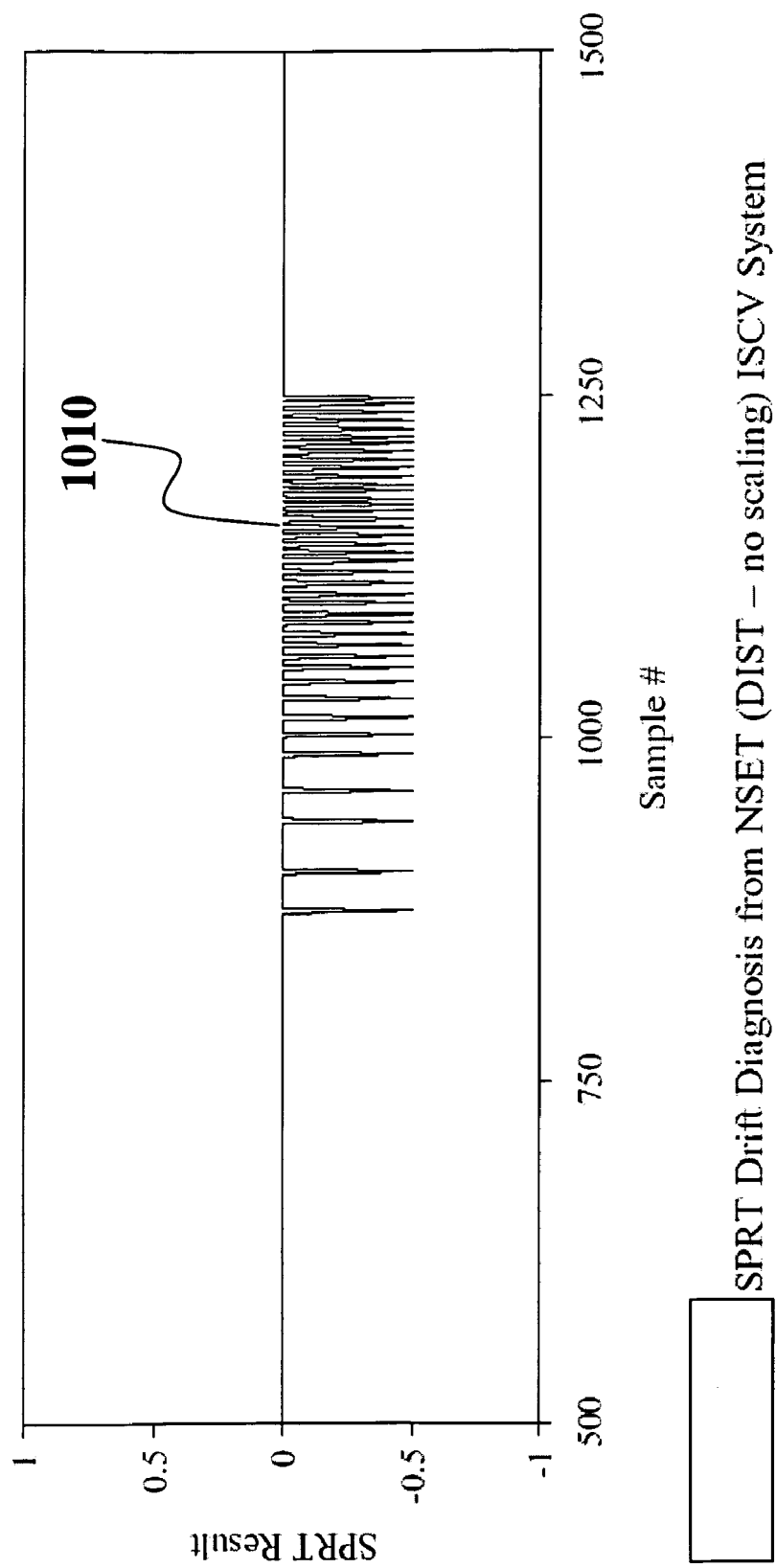
FIG. 10 illustrates the SPRT Drift Diagnosis from NSET (DIST—no scaling) ISCV System.

In FIG. 10, the drift has been detected after 125 samples as shown by SPRT results curve 1010. The magnitude of the drift at this initial point of detection is 0.25% FS. This sensitivity, as previously mentioned, was arbitrarily selected to represent a typical application. Most applications allow for some calibration drift, otherwise continuous calibration is required (drift happens). Much finer sensitivity, when desirable (or even practical) can be obtained by adjusting a single parameter of the SPRT.

As is apparent in Table 1, several operators produced acceptable prediction errors on the natural test data (containing no drift or measurement error). Some of these operators were found to be highly susceptible to measurement error and thereby less suitable than the chosen DIST/RMPE operator.

Figure 11:
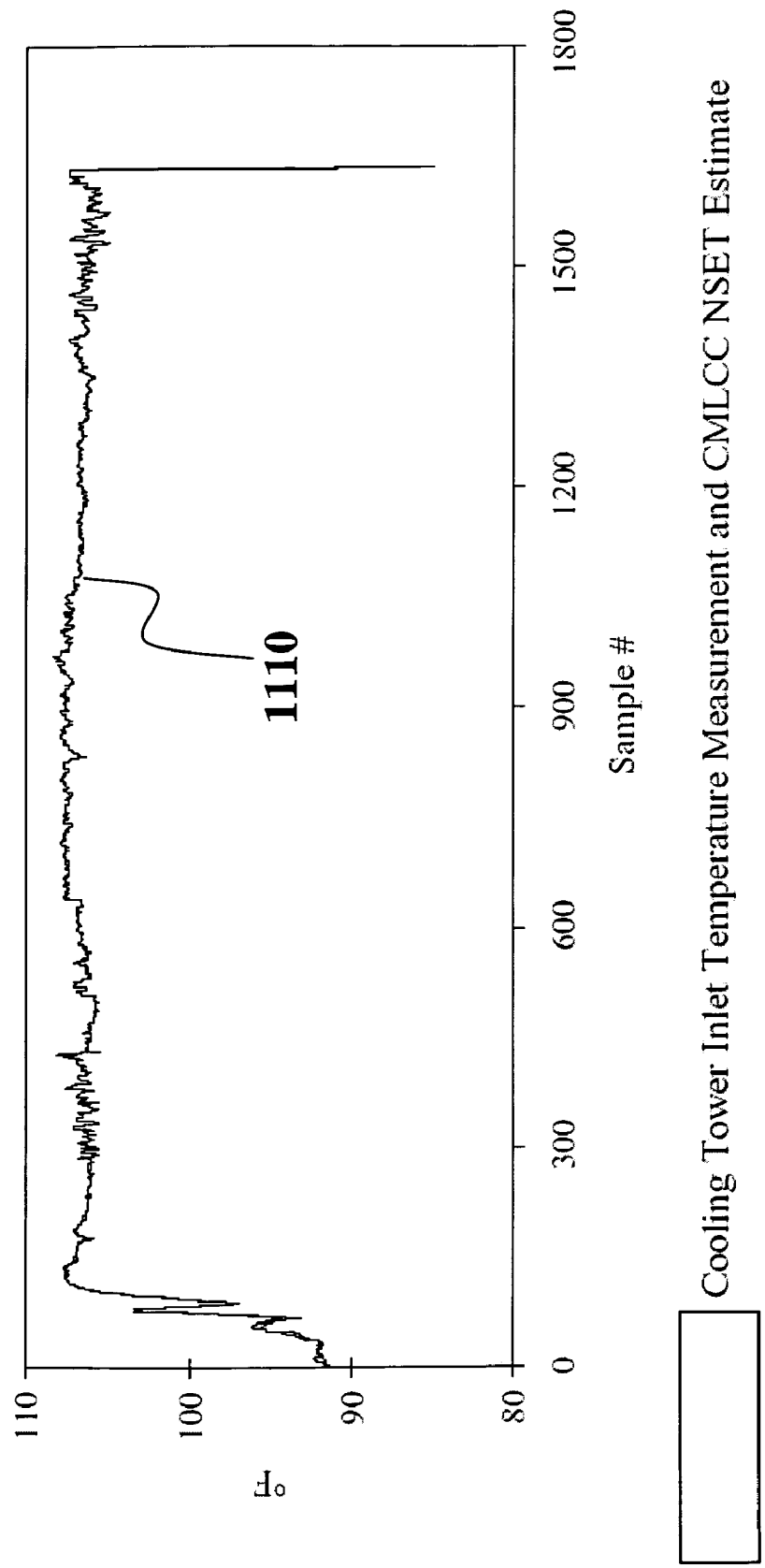
FIG. 11 illustrates the Cooling Tower Inlet Temperature Measurement and CMLCC NSET Estimate.
Figure 12:
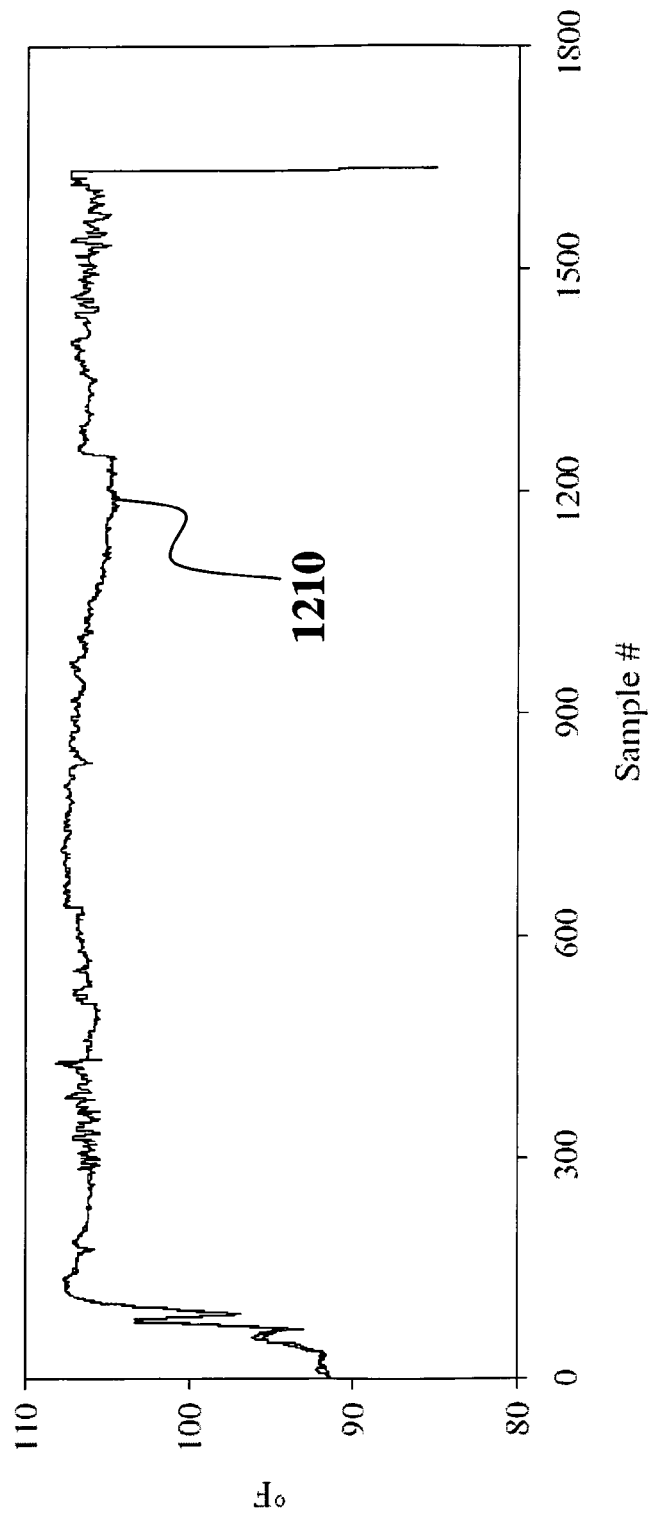
FIG. 12 illustrates the Cooling Tower Inlet Temperature Measurement (Drifted) and CMLCC NSET Estimate.

FIGS. 11 and 12 demonstrate respectively the high accuracy clean data estimation and the deficiency typical of NSET estimation with some of these operators, in this case the common mean linear correlation coefficient (CMLCC). First, estimation is demonstrated with no drift or measurement error in curve 1110 of FIG. 11. Curve 1210 of FIG. 12 then demonstrates the model performance with 0.002% FS drift per sample. As seen previously, the CMLCC seems to provide very accurate prediction, as long as measurements are relatively consistent and free of measurement error. However, as soon as the measurement in FIG. 12 begin to drift, an undesirable behavior of the system incorporating the CMLCC operator comes to light: the estimate follows the measurement closely, even as the measurement drifts! The NSET with the CMLCC, as well as with other unsuitable operator choices, cannot predict drift and other forms of measurement error.

A nonlinear state estimation technique (NSET) has been developed as a generalization of the multivariate state estimation technique (MSET), which is an extension of the multiple regression equation. Several nonlinear operators have been employed and explored for the measurement similarity/distance pattern comparison implicit in the NSET. Although several operators provided very good 'clean data' model prediction, only a few operators give robust estimation in the presence of measurement errors.

The root mean power error (RMPE) operator can provide the most robust prediction, being virtually impervious to measurement error. The RMPE also provided its most accurate prediction (while retaining its robust character) with a Minkowski parameter of 2.0. This parameter value rendered the RMPE equivalent to its more specific (also independently explored), and conveniently coded (such that it is almost 60% faster) version—Euclidean distance (DIST).

In this ICVS example, the NSET outfitted with the RMPE/DIST operator predicted over 140 measurement vectors (each with 34 components) per second in an interpreted environment. Real time or faster than real time prediction and monitoring of thousands of variables would be possible for a compiled standalone ICVS(with detection of fractional % FS errors) or other process modeling application incorporating NSET on a dedicated inexpensive personal computer or workstation.

The method and system of this invention use a regularized NSET that utilizes regularization in the inversion of the prototype matrix. This regularization takes the form of either truncated singular value decomposition (TSVD) or Tikhonov regularization (popularly known in a standard form as ridge regression) in the inversion of troublesome prototype matrices. This regularization results in improved matrix conditioning, which improves model stability and prediction accuracy. Ridge regression is preferred over TSVD, as the regularization co-efficient is easier to optimize automatically.

The ability of the method and system of this invention to use a broader spectrum of distance function results in an advantage of allowing the development of more flexible models that may be optimized to the particular data set or system to be modeled.

The method and system of this invention can be implemented as operational instructions, stored in memory, and executed by a processing module. The processing module may be a single processing device or a plurality of processing devices. Such a processing device may be a micro-processor, micro-computer, digital signal processor, central processing unit of a computer or workstation, digital circuitry, state machine, and/or any device that manipulates signals (e.g., analogue and/or digital) based on operational instructions. The memory may be a single memory device or a plurality of memory devices. Such a memory device may be a random access memory, read-only memory, floppy disk memory, hard drive memory, extended memory, magnetic tape memory, zip drive memory and/or any device that stores digital information. Note that when a processing module implements one or more of its functions, via state machine or logic circuitry, the memory storing the corresponding operational instructions is embedded within the circuitry comprising the state machine or logic circuitry.

The NSET method and system of this invention can be implemented over a computer network, such as the internet, and can obtain data points from a database that need not be co-located with the processing device.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. An apparatus for monitoring an instrumented system, comprising:
   a memory for storing a set of reference observations (A) of said system;
   at least one processor for executing operational instructions;
   operational instructions for obtaining an input observation (y) of data values representative of the state of the system;
   operational instructions for generating an estimate (y-prime) of at least one data value of said instrumented system using a regularized nonlinear state estimation technique based on said input observation (y) and on said reference observations (A) by applying a nonlinear similarity operator in substitution for linear matrix multiplication in the formation of a prototype matrix ($A^T \oplus A$) from said reference observations; and
   operational instructions for comparing said estimate to a corresponding data value of said input observation and determining a condition of said instrumented system,
   wherein said nonlinear similarity operator is chosen from the set consisting of the following terms and the following terms added to one and inverted:
   Bernoulli difference;
   Relative entropy;
   Euclidean norm;
   City block distance;
   Linear correlation coefficient;
   Common mean linear correlation coefficient;
   Root mean power error; and
   Scaled mean power error.

2. An apparatus according to claim 1, wherein said nonlinear state estimation technique is regularized by performing ridge regression.

3. An apparatus according to claim 1, wherein said nonlinear state estimation technique is regularized by performing truncated singular value decomposition.

4. An apparatus according to claim 1, wherein operational instructions for comparing include instructions for determining the difference between said estimate and said corresponding data value to form a residual value.

5. An apparatus according to claim 1, further comprising operational instructions for clustering a set of historic data observations of said system to produce said set of reference observations for storage in said memory.

6. An apparatus according to claim 5, in which said operational instructions for clustering are disposed to cluster said set of historic data observations and add to said set of reference observations at least one historic data observation closest to a cluster center.

7. An apparatus according to claim 1, wherein said nonlinear similarity operator is the Euclidean Norm added to one and inverted.

8. An apparatus according to claim 1, wherein said nonlinear similarity operator is the Root Mean Power Error added to one and inverted.

9. An apparatus for monitoring an instrumented system, comprising:
   a memory for storing a set of reference observations (A) of said system;
   at least one processor for executing operational instructions;
   operational instructions for obtaining an input observation (y) of data values representative of the state of the system;

operational instructions for generating an estimate (y-prime) of at least one data value of said instrumented system using a regularized nonlinear state estimation technique based on said input observation (y) and on said reference observations (A) by applying a nonlinear similarity operator in substitution for linear matrix multiplication in forming the product ($A^T \oplus y$) of said input observation and said reference observations; and operational instructions for comparing said estimate to a corresponding data value of said input observation and determining a condition of said instrumented system, wherein said nonlinear similarity operator is chosen from the set consisting of the following terms and the following terms added to one and inverted:

Bernoulli difference;
Relative entropy;
Euclidean norm;
City block distance;
Linear correlation coefficient;
Common mean linear correlation coefficient;
Root mean power error; and
Scaled mean power error.

10. An apparatus according to claim 9, wherein said nonlinear similarity operator is the Euclidean Norm added to one and inverted.

11. An apparatus according to claim 9, wherein said nonlinear similarity operator is the Root Mean Power Error added to one and inverted.

12. An apparatus for monitoring an instrumented system, comprising:

a memory for storing a set of reference observations (A) of said system;

at least one processor for executing operational instructions;

operational instructions for obtaining an input observation (y) of data values representative of the state of the system;

operational instructions for generating an estimate (y-prime) of at least one data value of said instrumented system using a regularized nonlinear state estimation technique based on said input observation (y) and on said reference observations (A) by applying a nonlinear similarity operator in substitution for linear matrix multiplication in forming the product ($A^T \oplus y$) of said input observation and said reference observations;

operational instructions for comparing said estimate to a corresponding data value of said input observation and determining a condition of said instrumented system; and operational instructions for matching at least one condition of at least one data value of said input observation with corresponding data of said reference observations in order to select a subset of said reference observations to populate a prototype matrix based on which said estimate is generated.

13. A method for monitoring an instrumented system, comprising:

providing a set (A) of reference observations of said system;

obtaining an input observation (y) of data values representative of the state of the system;

generating an estimate (y-prime) of at least one data value of said instrumented system using a regularized nonlinear state estimation based on said input observation (y) and on said reference observations (A) by applying a nonlinear similarity operator in substitution for linear matrix multiplication in the formation of a prototype matrix ($A^T \oplus A$) from said reference observations;

comparing said estimate to a corresponding data value of said input observation; and determining a condition of said instrumented system based on said comparing step, wherein said nonlinear similarity operator is chosen from the set consisting of the following terms and the following terms added to one and inverted:

Bernoulli difference;
Relative entropy;
Euclidean norm;
City block distance;
Linear correlation coefficient;
Common mean linear correlation coefficient;
Root mean power error; and
Scaled mean power error.

14. A method according to claim 13, wherein said regularized nonlinear state estimation is regularized by performing ridge regression.

15. A method according to claim 13, wherein said regularized nonlinear state estimation is regularized by performing truncated singular value decomposition.

16. A method according to claim 13, wherein said step of comparing includes determining the difference between said estimate and said corresponding data value to form a residual value.

17. A method according to claim 16, wherein said step for comparing further includes performing a sequential probability ratio test on a sequence of said residuals corresponding to a sequence of input observations.

18. A method according to claim 13, further comprising the step of clustering a set of historic data observations of said system to provide said set of reference observations.

19. A method according to claim 18, in which said clustering step includes clustering said set of historic data observations and adding to said set of reference observations at least one historic data observation closest to a cluster center.

20. A method for monitoring an instrumented system, comprising:

providing a set (A) of reference observations of said system;

obtaining an input observation (y) of data values representative of the state of the system;

generating an estimate (y-prime) of at least one data value of said instrumented system using a regularized nonlinear state estimation based on said input observation (y) and on said reference observations (A) by applying a nonlinear similarity operator in substitution for linear matrix multiplication in forming the product ($A^T \oplus y$) of said input observation and said reference observations;

comparing said estimate to a corresponding data value of said input observation; and determining a condition of said instrumented system based on said comparing step, wherein said nonlinear similarity operator is chosen from the set consisting of the following terms and the following terms added to one and inverted:

Bernoulli difference;
Relative entropy;
Euclidean norm;
City block distance;
Linear correlation coefficient;
Common mean linear correlation coefficient;
Root mean power error; and
Scaled mean power error.

21. A method for monitoring an instrumented system, comprising:
- providing a set (A) of reference observations of said system;
- obtaining an input observation (y) of data values representative of the state of the system;
- generating an estimate (y-prime) of at least one data value of said instrumented system using a regularized nonlinear state estimation based on said input observation (y) and on said reference observations (A);
- comparing said estimate to a corresponding data value of said input observation;
- determining a condition of said instrumented system based on said comparing step; and
- matching at least one condition of at least one data value of said input observation with corresponding data of said reference observations in order to select a subset of said reference observations to populate a prototype matrix based on which said estimate is generated.

22. An apparatus for monitoring an instrumented system, comprising:
- a memory for storing a set of reference observations of said system;
- at least one processor for executing operational instructions;
- operational instructions for obtaining an input observation of data values representative of the state of the system;
- operational instructions for matching at least one condition of at least one data value of said input observation with corresponding data of said reference observations in order to select a subset of said reference observations;
- operational instructions for applying a nonlinear similarity operator to said subset of said reference observations to form a prototype matrix ($A^T \oplus A$) from said subset of said reference observations;
- operational instructions for applying a nonlinear similarity operator in forming the product ($A^T \oplus y$) of said input observation and said subset of said reference observations;
- operational instructions for computing weights from said prototype matrix and said product;
- operational instructions for generating an estimate of at least one data value of said instrumented system by combining said subset of said reference observations according to said weights; and
- operational instructions for comparing said estimate to a corresponding data value of said input observation and determining a condition of said instrumented system.

23. An apparatus according to claim 22, wherein at least one of said nonlinear similarity operators is a scalar valued function of said reference observations, added to one and inverted.

24. An apparatus for monitoring an instrumented system, comprising:
- a memory for storing a set of reference observations of said system;
- at least one processor for executing operational instructions;
- operational instructions for obtaining an input observation of data values representative of the state of the system;
- operational instructions for applying a nonlinear similarity operator to said reference observations to form a prototype matrix ($A^T \oplus A$) from said reference observations;
- operational instructions for applying a nonlinear similarity operator in forming the product ($A^T \oplus y$) of said input observation and said reference observations;
- operational instructions for computing weights from said prototype matrix and said product;
- operational instructions for generating an estimate of at least one data value of said instrumented system by combining said reference observations according to said weights;
- operational instructions for comparing said estimate to a corresponding data value of said input observation and determining a condition of said instrumented system;
- wherein at least one of said nonlinear similarity operators is a scalar valued function of vectors, added to one and inverted.

25. An apparatus according to claim 24, wherein said scalar valued function of vectors is selected from:
Bernoulli difference;
Relative entropy;
Euclidean norm;
City block distance;
Linear correlation coefficient;
Common mean linear correlation coefficient;
Root mean power error;
Scaled mean power error; and
Matrix Multiplication.

26. An apparatus according to claim 25, wherein said scalar valued function of vectors is city block distance.

27. An apparatus according to claim 25, wherein said scalar valued function of vectors is root mean square error.

28. An apparatus according to claim 25, wherein said scalar valued function of vectors is Euclidean distance.

* * * * *